Dec. 11, 1951   G. F. MYERS   2,578,578
CONVERTIBLE AIRCRAFT LANDING GEAR
Filed March 4, 1946
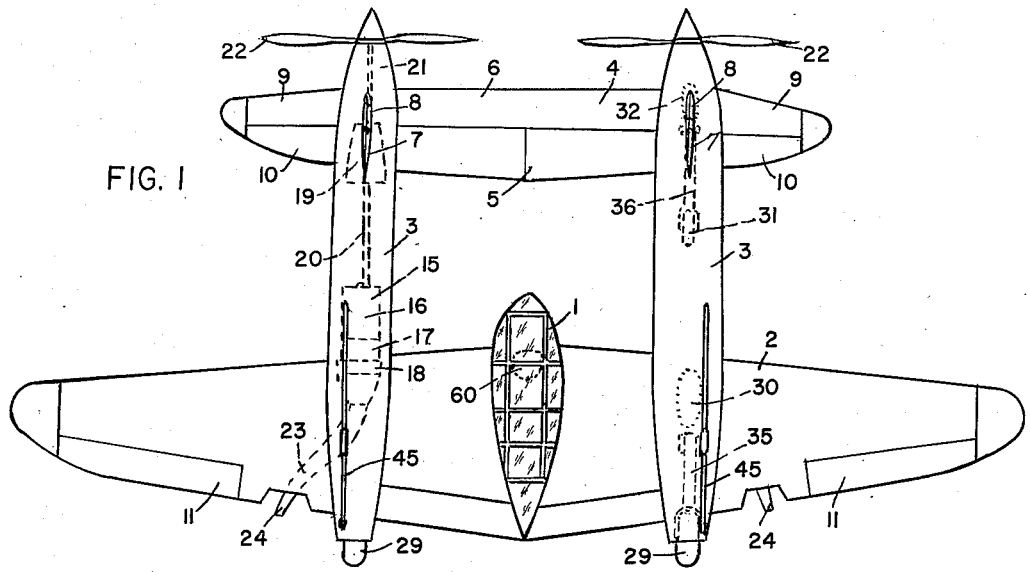
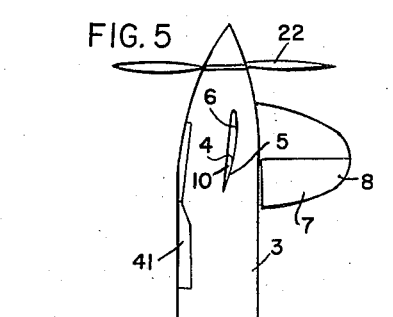
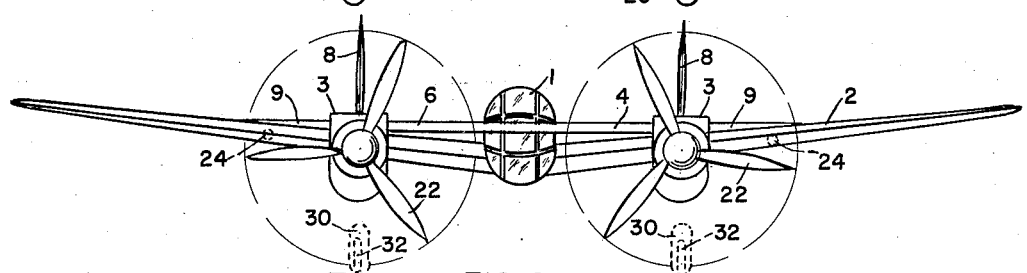
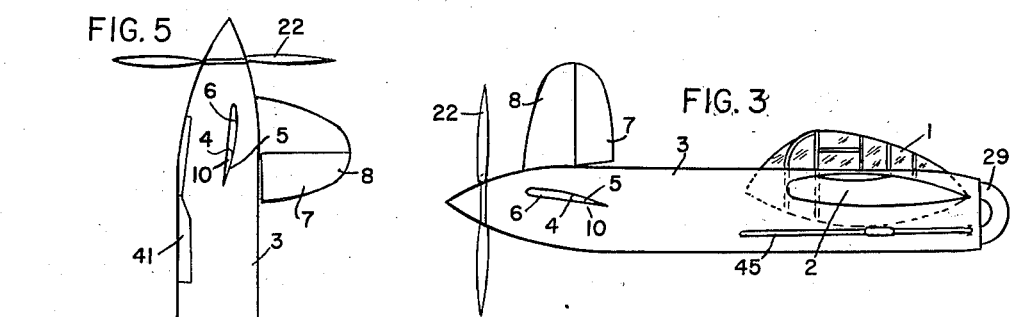
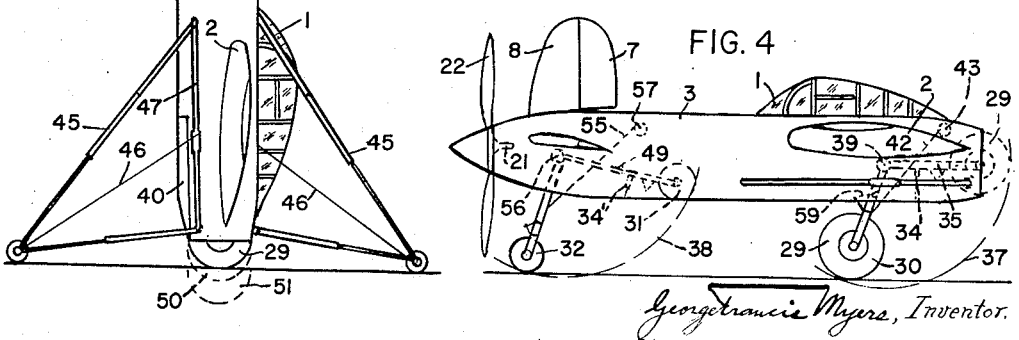
George Francis Myers, Inventor.

Patented Dec. 11, 1951

2,578,578

UNITED STATES PATENT OFFICE 2,578,578

CONVERTIBLE AIRCRAFT LANDING GEAR

George Francis Myers, New York, N. Y.

Application March 4, 1946, Serial No. 651,760

1 Claim. (Cl. 244—102)

This invention relates to flying machines and particularly to convertible aircraft, or tail-end machines.

It has for its object to produce a flying machine that can land horizontally like an airplane at an airport, or like a helicopter on inhospitable terrain.

Another object is to produce tail-end machine with impact wheels that can be used both for landing horizontally and when landing vertically by swinging the wheels from one position on the hollow body to another.

With these and other objects in view the invention consists in certain novel features of construction and combination hereinafter to be described and then more particularly pointed out in the claim.

In the accompanying drawing, where similar numerals of reference denote similar parts throughout the several views:

Fig. 1 is a plan view of the invention when the craft is flying horizontally or a rear view if the machine is standing on the ground and positioned vertically. In the left hand boom or hollow body or fuselage or the like is shown an outline dotted lines of the propjet engine driving the left hand screw or propeller or rotor, and in the right hand boom are shown the different positions taken by the ground wheels, or landing gear, or earth engaging means.

Fig. 2 is a front elevation of the machine and shows the position of the landing wheels in dotted lines.

Fig. 3 is a side elevation of the craft flying through the air with all the landing gear retracted. The pilot's cabin or compartment is shown in both full and dotted lines; almost the whole of the cabin is formed of transparent material, so that the pilot can see in every direction both when he is flying vertically, that is, rising or descending as a helicopter, and when flying horizontally as an airplane.

Fig. 4 is another side elevation of the machine showing it making a landing at an airport or airstrip or the like, and also showing the position of the landing wheels when retracted in dotted lines as well as their means of retraction and their safety catches. As will be noted the rear wheels perform the office of tail-end wheels (in dotted lines) for vertical landing and can be swung into position (in full lines) for horizontal landing.

Fig. 5 is a side elevation of the craft shown as having landed in its vertical position with its landing legs or braces spread out in order to give firm footing to the machine when standing in the vertical position. Also the two doors are shown covering and enclosing the front and rear wheels and their mechanism. The legs carry their own covers.

The invention is constructed and operated substantially and preferably as follows:

The landing gear comprises two large wheels 29 (and while wheels are designated throughout the specification any other form of earth engaging means may be used) located at the rear end of the booms streamlining the same. In their normal positions the two large wheels 29 are retracted about one-half their diameter into the rear end of the booms as more particularly brought out in Figures 2 and 4. However when coming down vertically the wheels are allowed to drop a certain distance either to 50 or even to 51, as outlined in my Patent 2,022,476 of November 26, 1935, and its predecessor applications as therein noted. In order to support the landed craft when on the ground the four (more or less) landing legs or braces 45 are employed. These braces are telescopic and retract into the openings 47 in the booms by the cords 46 which may be operated by servomotors or manually.

The wheel 29 is mounted on the brace or lever 35 and may be drawn up into the boom by the cord 42 by the servomotor 43, and held there by the spring catch or latch 34 shown diagrammatically. In retracting said wheel it will move through the arc of a circle 37 with 39 as a center through a little more than a right angle or ninety degrees and will then take the position shown in dotted lines at 30 in Fig. 1 or in full lines in Fig. 4 held by the catch 59 shown diagrammatically.

The forward wheel 32 is similarly mechanized: the brace 49 thereof is drawn up into the boom by the cord 55 operated by the servomotor 57, and moving through the arc 38 with 56 as a center; when retracted into the boom into the position 31 the spring catch 34' shown diagrammatically holds it in position.

The main or rear wheel and its brace or lever are hinged to the inside of the boom; the brace being of such a length that when the wheel is in its rearmost position the brace lies parallel with the axis of the boom and is held in this position by a spring catch or any other well known device for holding things rigid and operable by a cord or the like extending to the cabin of the craft, the wheel projecting out rearward just enough so as to line the wheel with the tail end of the boom and streamline the same. When the craft is in a horizontal position as in Fig. 5 and the said spring catch is loosened by any well known means, the wheel and brace will fall down and out of the boom taking the position shown in full lines in said Fig. 4 at a near right angle to the ground—to be exact the wheel swings through an arc of 100 degrees in practice.

Therefore it will be understood that various changes may be made in the form, proportion, size and detail of the several structures shown, the number and position of certain elements used, as well as the character of the motive power employed, without departing from the spirit of the invention.

In this connection it should be stated, that the craft is adapted to be sustained in flight with the axis thereof arranged substantially vertically or substantially horizontally; the empennage or tail unit being mounted in the front portion or nose of the craft, the machine shown will come under the canard type of airplane, although the machine can be designed and built with the tail unit at the usual place at the rear of the craft, or even with a single fuselage or hollow body; and the propellers or motors may be of large diameter as usual in machines of the above type.

I claim:

An aircraft comprising an elongated body disposed in the direction of the aircraft's longitudinal axis and ground engaging means pivotally secured to said body, said means being swingable between a first limiting position wherein said means is disposed outside of said body and offset from the longitudinal axis of said body, and a second limiting position wherein said means is disposed on the longitudinal axis of said body at one end of said body, whereby said means, when in said first position, constitutes a support for the aircraft in horizontal attitude, and said means, when in said second position, constitutes a support for the aircraft in vertical attitude.

GEORGE FRANCIS MYERS.

REFERENCES CITED

The following references are of record in the file of this patent:

UNITED STATES PATENTS

| Number | Name | Date |
| --- | --- | --- |
| 1,358,603 | Zahm | Nov. 9, 1920 |
| 1,786,545 | Noeggerath | Dec. 30, 1930 |
| 1,890,059 | Lake | Dec. 6, 1932 |
| 2,043,704 | McPherren | June 9, 1936 |
| 2,117,786 | Blume | May 17, 1938 |
| 2,194,060 | Van Vactor | Mar. 19, 1940 |
| 2,382,460 | Young | Aug. 14, 1945 |

FOREIGN PATENTS

| Number | Country | Date |
| --- | --- | --- |
| 468,063 | Great Britain | June 23, 1937 |
| 677,356 | France | Dec. 9, 1929 |